United States Patent
Potnis et al.

(10) Patent No.: US 12,366,699 B2
(45) Date of Patent: Jul. 22, 2025

(54) COUPLING NARROWBAND PROJECTOR SOURCE LIGHT INTO DISPLAY WAVEGUIDES

(71) Applicant: GOOGLE LLC, Mountain View, CA (US)

(72) Inventors: Shreyas Potnis, Kitchener (CA); Timothy Paul Bodiya, Toronto (CA); Dan Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 586 days.

(21) Appl. No.: 17/695,995

(22) Filed: Mar. 16, 2022

(65) Prior Publication Data
US 2023/0296822 A1 Sep. 21, 2023

(51) Int. Cl.
*G02B 26/08* (2006.01)
*F21V 8/00* (2006.01)
*G02B 26/10* (2006.01)

(52) U.S. Cl.
CPC ......... *G02B 6/005* (2013.01); *G02B 26/0816* (2013.01); *G02B 26/101* (2013.01)

(58) Field of Classification Search
CPC .. G02B 6/005; G02B 26/0816; G02B 26/101; G02B 6/0031; G02B 27/0172; G03B 21/008
See application file for complete search history.

(56) References Cited

U.S. PATENT DOCUMENTS

| | | | |
|---|---|---|---|
| 2018/0120559 A1* | 5/2018 | Yeoh | G02B 26/103 |
| 2019/0049677 A1 | 2/2019 | Yasumura et al. | |
| 2019/0285898 A1 | 9/2019 | Parsons | |
| 2020/0310111 A1 | 10/2020 | McNally et al. | |
| 2020/0310120 A1 | 10/2020 | Grief et al. | |

FOREIGN PATENT DOCUMENTS

| | | |
|---|---|---|
| EP | 3267236 B1 | 3/2021 |
| JP | 2010183272 A | 8/2010 |

OTHER PUBLICATIONS

International Search Report and Written Opinion mailed May 12, 2023 for PCT/US2023/011387, 9 pages.
International Preliminary Report on Patentability mailed Sep. 26, 2024 for PCT/US2023/011387, 6 pages.

* cited by examiner

*Primary Examiner* — Euncha P Cherry (57) ABSTRACT

A system includes a feedback loop that includes a light engine to generate light, a light engine controller to control operation of the light engine, a scanning device to scan a light beam across a range of scan angles to an incoupler of a waveguide, a photo-sensor to measure an amount of light outcoupled through the incoupler of the waveguide at the range of incident angles. The light engine controller adjusts one or more of a pulse duration, a phase, or a pulse frequency of the scanned light, based on an incident angle of the scanned light and the measured amount of light.

21 Claims, 7 Drawing Sheets

COUPLING NARROWBAND PROJECTOR SOURCE LIGHT INTO DISPLAY WAVEGUIDES

BACKGROUND

Some display systems employ a projector, which is an optical device that projects or shines a pattern of light onto another object (e.g., onto a surface of another object, such as onto a projection screen) in order to display an image or video. A scanning projector is an image display device that generally collimates light using specialized lenses and then scans the collimated light in a two-dimensional direction (horizontal direction and vertical direction) onto a projection surface to form an image or sequence of images. An example of such a projector is a laser projector, which generally includes multiple laser light sources that each generate laser light of a specific wavelength to produce laser light beams of different colors, for example, red, green, and blue colored laser light. Each beam of laser light generated by the laser projector is temporally modulated to provide a pattern of laser light. In addition to the laser light sources, a conventional laser projector includes at least one scan mirror that scans (or reflects) the laser light emitted from the laser light sources in at least one direction. Articulation of the scan mirror(s) is typically accomplished by a micro-electromechanical system (MEMS) that controls movement of the mirror(s) in response to actuation voltages provided by a power source associated with the laser projector.

Laser projectors can be incorporated into a variety of devices, including wearable heads-up displays (WHUDs) that are designed to be worn on the head of a user, to generate images, which are projected for viewing by a user via a display waveguide (referred to as "waveguide" hereinafter) positioned in front of the user's eye. WHUDs are typically configured such that a user views the images on a transparent surface configured to display, for example, augmented reality (AR) content, or such that a user views the images on an opaque surface that typically blocks light from the environment to create a virtual reality (VR) experience. In some cases, a WHUD includes a laser projector to generate light representing images that are then conveyed to the waveguide, which transmits the light representing the images to a user's eye. In a WHUD that is designed to have the general shape and appearance of eyeglasses or goggles, the waveguide is typically implemented in a "lens" portion (which may be fully or partially transparent, or entirely opaque), while the laser projector and other components, such as a controller and power source, are housed in a frame portion.

In some cases, the waveguide acts as a beam combiner to receive a plurality of wavelengths of laser light from an optical engine via a plurality of primary lenses and combine the wavelengths of laser light. AR headsets that use a waveguide as a beam combiner (referred to as a waveguide combiner) typically operate by generating collimated projector light (i.e., light having substantially parallel rays), which is then coupled into the waveguide combiner using a diffractive, holographic, or prism-based coupler. However, etendue—a property of light in an optical system that characterizes an amount of spreading of the light in area and angle—limits the efficiency of this coupling.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Typically, input light includes incident light that is coupled into the waveguide, while another portion of the input light is transmitted. It is desirable for the waveguide to propagate received light received at an incoupler grating (also referred to as an incoupler) of the waveguide along the waveguide within acceptable angles (e.g., angles acceptable to achieve total internal reflection (TIR) within the waveguide). For a given angle and beam width of incoming laser light, it is generally desirable for light incident at the side of the incoupler grating to bounce past the opposite edge of the grating. However, as the beam width increases, as the waveguide thickness becomes thinner, or as the grating pitch becomes smaller, light from one side of the grating interacts with the other side of the incoupler grating, causing light to exit the waveguide again and not be propagated along the waveguide by TIR, resulting in a so-called "double-bounce loss" and reduced coupling efficiency. More efficient coupling is achievable by using an incident beam that is smaller than a bounce spacing within the waveguide; however, a small beam spot size can adversely affect display sharpness.

FIGS. 1-10 illustrate techniques for time and wavelength multiplexing to improve the efficiency and display sharpness of a display system. Certain input angles of incident light result in higher coupling efficiency and other input angles of incident light result in lower coupling efficiency. A correlation between an angle of incident light and the efficiency with which the incident light is coupled into the waveguide is referred to herein as a "mode" of the waveguide, such that certain input angles coincide with a high-efficiency mode of the waveguide and other input angles coincide with a low-efficiency mode of the waveguide. In some embodiments, a display system implements a feedback loop that includes a light engine to generate laser light, a microelectromechanical systems (MEMS) controller to control a scan angle of light emitted from the light engine, and a photo-sensor to measure fine angular dependence of the coupling efficiency and to reduce the mean optical power for coupling light into the waveguide. The photo-sensor measures an amount of light outcoupled through the incoupler of the waveguide at the range of incident angles of light from the light engine and generates a measurement indicator signal that is then fed back to the MEMS controller of the light engine or to the laser pulse controller to adjust pulse duration, phase, and/or pulse frequency (i.e., pulse timing) to maximize coupling into the waveguide.

In some embodiments, the display system includes a scanning device that scans a beam of light generated by the light engine across a range of scan angles spanning multiple waveguide modes. The feedback loop identifies incident angles of scanned light that result in an amount of outcoupled light that is lower than a predetermined threshold amount (referred to as a high-efficiency incident angle) and signals the light engine to generate light only or primarily when a scan angle is one of the identified high-efficiency incident angles. Conversely, in some embodiments, in response to the feedback loop identifying incident angles of scanned light that result in an amount of outcoupled light that is higher than the predetermined threshold amount, the feedback loop signals the light engine to increase the amount of generated light. For example, in some embodiments, the feedback loop signals the light engine to increase the pulse frequency of the generated light when the scanned light is at a high-efficiency incident angle. Thus, the feedback loop signals the light engine to change the amount of generated light in response to identifying incident angles of scanned light that result in a change in the amount of outcoupled light. In some embodiments, to maximize the amount of light that is input to the waveguide at the high-efficiency incident angles, the scanning device scans a beam of light generated by the light engine stepwise across a range of scan angles spanning a plurality of waveguide modes such that the scanning device pauses or slows down when scanning across the high-efficiency incident angles and moves relatively faster when scanning across other incident angles.

In some embodiments, the display system activates the light engine when the scanning device scans across the high-efficiency incident angles and deactivates the light engine when the scanning device scans across other incident angles. In some embodiments, the display system adjusts a frequency of generated light such that while the laser is being scanned across a range of angles, the laser frequency is adjusted at each angle such that the laser frequency corresponds to a waveguide mode. The laser scanning frequency and phase are adjusted in a feedback loop to provide high efficiency coupling into the waveguide. In some embodiments, the display system adjusts pulse timing of the laser to time the pulses such that the laser pulses only when the laser beam is on resonance. Thus, the laser beam is not turned on when it is not in resonance with the waveguide, saving power.

Figure 1:
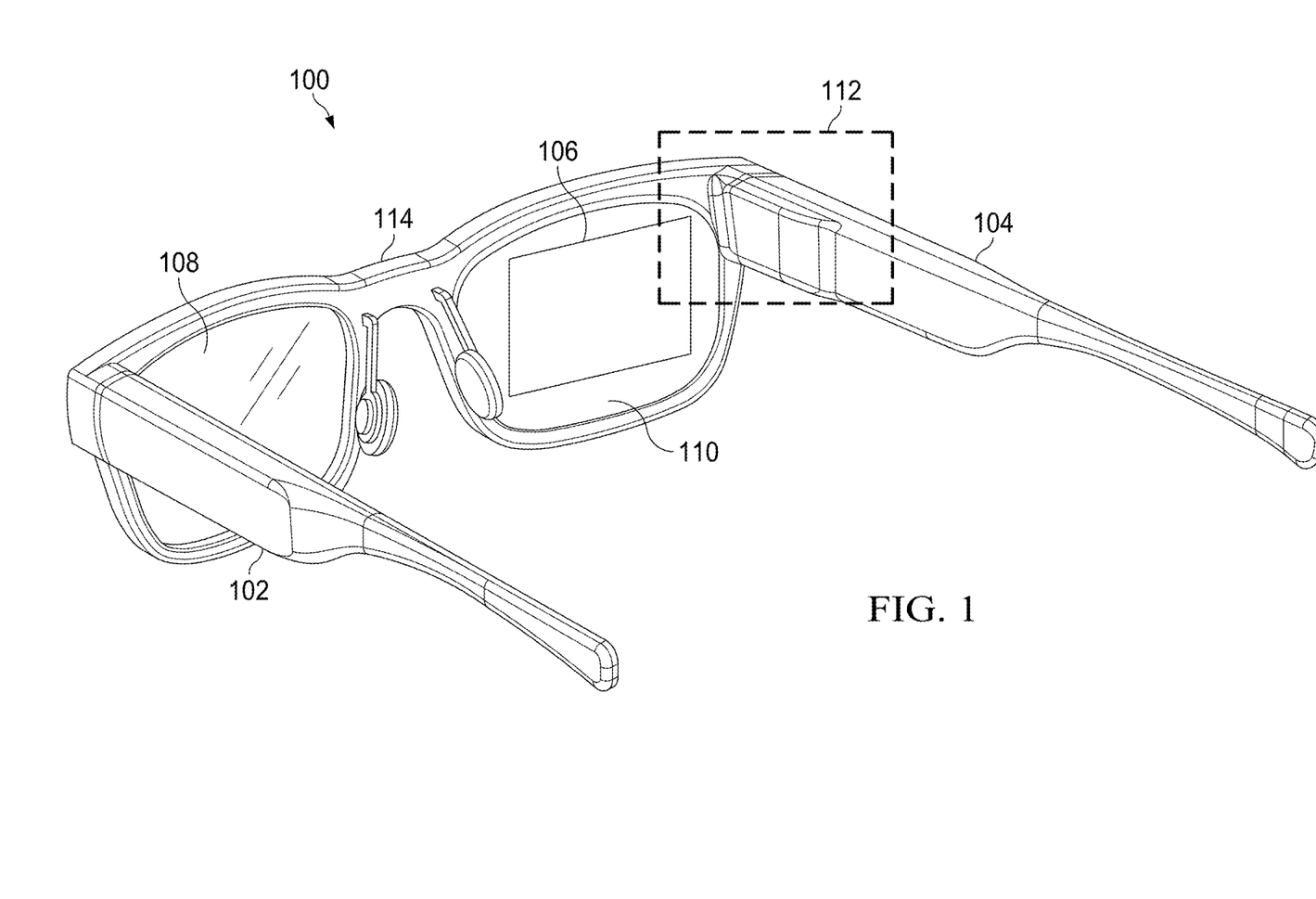
FIG. 1 illustrates an example image display system employing a scanning-based projection system housing a feedback circuit for time and wavelength multiplexing, in accordance with some embodiments.

FIG. 1 illustrates an example display system 100 employing a scanning-based projection system and a feedback loop to identify high-efficiency incident angles of scanned light at an incoupler of a waveguide and increase the transmission of light at the identified high-efficiency incident angles in accordance with some embodiments. The display system 100 has a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 a near-eye display system in the form of a WHUD in which the support structure 102 is configured to be worn on the head of a user and has a general shape and appearance (or "form factor") of an eyeglasses frame. The support structure 102 contains, or otherwise includes, various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 can further include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. In some embodiments, some or all of these components of the display system 100 may be housed in a nose bridge portion 114 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, and one or more scan mirrors. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light-emitting diodes (LEDs) and a dynamic reflector mechanism such as one or more dynamic scanners or digital light processors. In some embodiments, the projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor that generates content to be displayed at the display system 100.

The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. In some embodiments, at least a portion of an outcoupler of the waveguide may overlap the FOV area 106. Generally, it is desirable for a display to have a wide FOV to accommodate the outcoupling of light across a wide range of angles. Herein, the range of different user eye positions that will be able to see the display is referred to as the eyebox of the display. In some embodiments, the projector routes light via at least one scan mirror, a transfer optic, and a waveguide disposed at the output of the transfer optic. Particular embodiments of these aspects are described in greater detail below.

To facilitate more efficient coupling with the waveguide, a controller of a light engine of the projector employs a feedback loop to control adjustments of pulse duration, phase, and/or pulse timing. The feedback loop includes the light engine controller, a scanning device, and a photo-sensor that provides feedback to the light engine controller indicating measurements of an amount of light that is outcoupled through (or, in some embodiments, reflected by) an incoupler of the waveguide. Examples of photo-sensors include, but are not limited to, photodiodes, photoresistors, phototransistors, single-pixel cameras, etc. The light engine controller then adjusts the pulse duration, phase, and/or pulse timing based on the feedback to maximize the amount of laser light that is input to the waveguide at high-efficiency incident angles.

Figure 2:
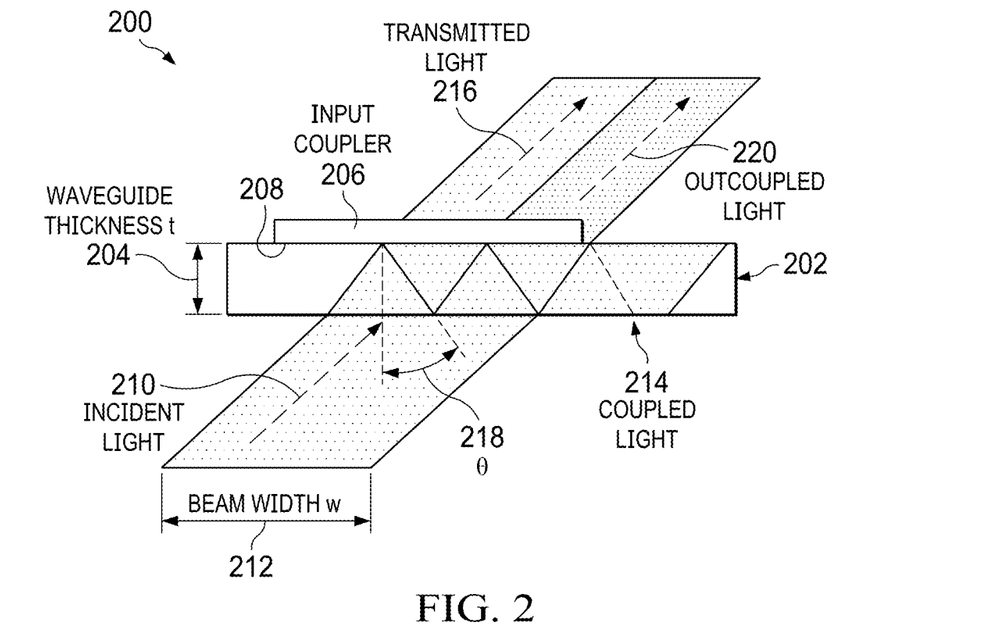
FIG. 2 is a diagram illustrating a coupling arrangement for coupling light into a waveguide.

FIG. 2 illustrates an example coupling arrangement 200 for coupling light into a waveguide 202. As shown in FIG. 2, the waveguide 202 has a waveguide thickness 204. An input coupler 206 (e.g., "incoupler") that includes an input coupler grating 208, couples light from a light source (e.g., a projector or light engine) into the waveguide 202. In some WHUDs, the incoupler 206 of the waveguide 202 is implemented as a diffraction grating disposed at a surface of the waveguide 202, wherein the diffraction grating diffracts different wavelengths of laser projector light at different angles. Because of these different diffraction angles, the different wavelengths of the display light have different angles of propagation within the waveguide 202 and therefore have different distances between total internal reflection (TIR) bounces within the waveguide after being transmitted or reflected by a diffraction grating incoupler. That is, light diffracted at a relatively steep angle (relative to normal) will bounce a greater number of times within a given length than light diffracted at a more gradual angle. The different diffraction angles of each wavelength of light can cause some light to be lost from the waveguide 202 through the double bounce effect, wherein light that is transmitted or reflected by the incoupler 206 a first time at a relatively steep angle may be incident on the incoupler 206 a second time as a result of being reflected from a surface of the waveguide 202 back towards the incoupler 206. When the light is incident on the incoupler 206 for a second time, some of the light is transmitted or reflected out of the waveguide (i.e., "lost") and, as a consequence, less light than was originally emitted from the projector is transmitted through the waveguide 202 to a user's eye resulting in reduced brightness of the image displayed to a user and a diminished user experience As shown in FIG. 2, the input light may include incident light 210 having a beam width 212. In the example of FIG. 2, a fraction of the incident light 210, shown as coupled light 214, is coupled into the waveguide 202, while another portion of the input light is transmitted, shown as transmitted light 216. The waveguide 202 propagates received light along the waveguide 202 within acceptable angles (e.g., angles acceptable to achieve total internal reflection (TIR) within the waveguide 202). The waveguide 202 is shown as propagating the received light along the waveguide 202 with an angle θ 218. For simplicity, reflected light is not shown in FIG. 2.

For a given angle and beam width 212 of incoming laser light, it is generally desirable for light incident at the side of the incoupler grating 208 to bounce past the opposite edge of the incoupler grating 208. As the beam width 212 gets larger, as the waveguide thickness 204 gets thinner, or as the grating pitch gets smaller (e.g., with incoupler gratings tuned to higher frequency light, such as light in the blue spectrum, having smaller grating pitches than those tuned to lower frequency light, such as light in the red spectrum) it can occur that light from one side of the incoupler grating 208 interacts with the other side of the incoupler grating 208. This second interaction with the incoupler grating 208 causes light to exit the waveguide again and not be propagated along the waveguide by TIR, resulting in a "double-bounce loss". Thus, when the fraction of incident light that is coupled in the waveguide (i.e., coupled light 214) hits the incoupler grating 208 a second time, a fractional portion of this light is outcoupled, shown as outcoupled light 220, resulting in reduced coupling efficiency.

However, if the incident light 210 is narrowband (i.e., the beam coherence length is larger than the round trip distance traveled in the waveguide), then the outcoupled light 220 may interfere with the transmitted (or reflected) light, and depending on their relative phase (i.e., they can either add to each other, or cancel each other out). The coupling efficiency increases when a k-vector of the coupled light 214, which defines a direction in which a light wave propagates, matches with the interference effect as a function of the incident angle at the waveguide 202, referred to as a "mode" of the waveguide. This interference effect results in an angle dependent coupling efficiency, as illustrated in FIG. 3.

Figure 3:
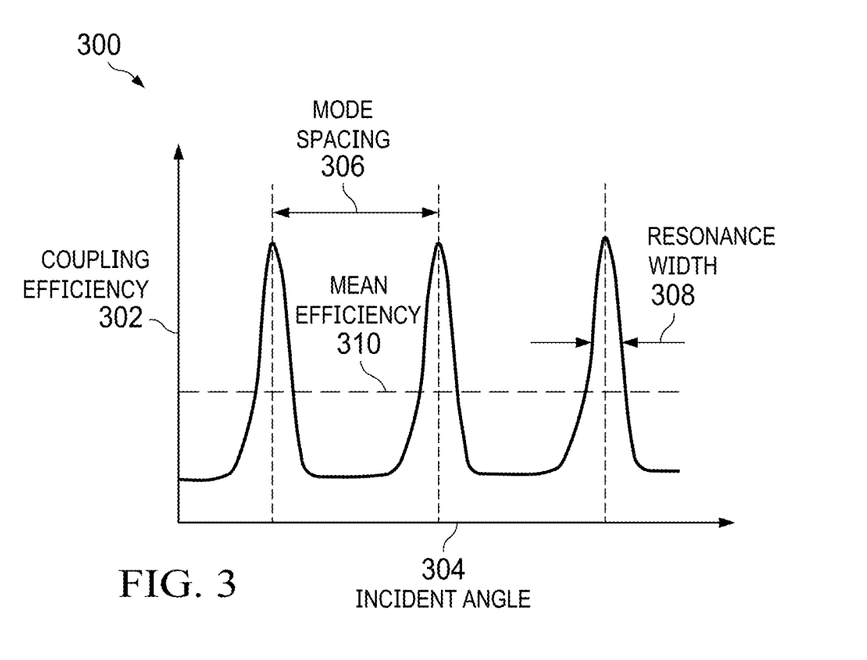
FIG. 3 is a graph illustrating coupling efficiency into a waveguide as a function of an incident angle, in accordance with some embodiments.

FIG. 3 is an example graph 300 illustrating coupling efficiency 302 into the waveguide 202 as a function of an incident angle 304. In the example of FIG. 3, the coupling efficiency 302 increases when a wave-vector of the coupled light 214 matches with a "mode" of the waveguide 202. The coupling efficiency 302 decreases when the coupled light wave-vector and the waveguide mode are mis-matched. Mode spacing 306 is indicated by consecutive peaks in coupling efficiency 302, and resonance width 308 is indicated by a difference in incident angle 304 between an increase and a decrease in coupling efficiency 302. In this context, "mode spacing" refers to the angular distance between incident angles having additive interference effects. Further, "resonance" refers to the effect of an incident angle having a purely additive interference effect. "Resonance width" refers to the range of input angles having the additive interference effect. A horizontal dashed line indicates the mean efficiency 310, which is the efficiency averaged over a small range of incident angles 304.

Figure 4:
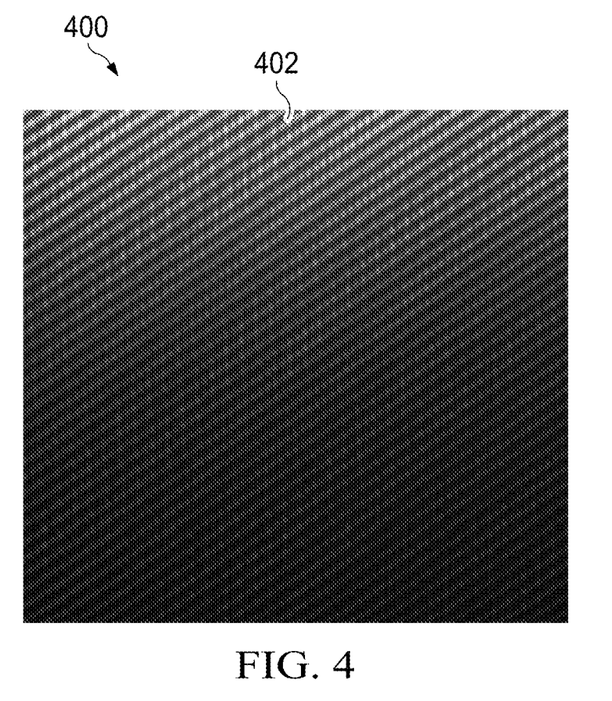
FIG. 4 is a measured mode structure for light in a field of view area, in accordance with some embodiments.

FIG. 4 illustrates an example measured mode structure 400 for blue light in a 2 degree×2 degree patch in the field of view area 106. Bright lines 402 correspond to incident angles that are in resonance with a waveguide mode (incident angles that result in resonance (i.e., additive interference effects within the waveguide)).

Figure 5:
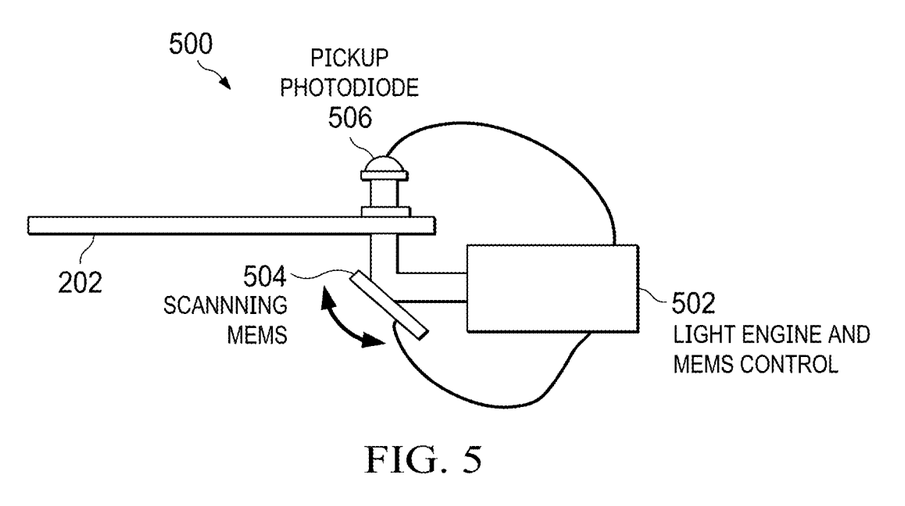
FIG. 5 is a diagram illustrating a feedback circuit in a light engine, in accordance with some embodiments.

In some example embodiments, the display system 100 uses a feedback circuit to measure the fine angular dependence of the coupling efficiency 302 and reduce the mean optical power required to couple light into the waveguide 202. FIG. 5 illustrates a feedback circuit 500 shown as a feedback loop that includes a light engine with a light engine controller 502 to control operation of the light engine, a scanning device 504 (e.g., a scanning mirror) communicatively coupled to the light engine controller 502, and a photo-sensor 506 communicatively coupled to the light engine controller 502. The light engine generates light such as collimated laser light which is scanned into the waveguide 202 by the scanning device 504. In some embodiments, the scanning device 504 includes a microelectromechanical systems (MEMS) scanning device. In some embodiments, the light engine controller 502 includes a MEMS controller.

The photo-sensor 506 measures an amount of light transmitted (outcoupled) through an incoupler of the waveguide, generates a measurement indicator signal (not shown) and sends the measurement indicator signal to the light engine controller 502. The measurement signal is thus fed back into the light engine controller 502, which controls the operation of the light engine to adjust one or more of pulse duration, phase, or frequency of generated light, based on a current measurement indicator signal received from the photo-sensor 506.

The scanning device 504 scans a beam across an angular range of scan angles spanning a plurality of waveguide modes, as discussed further below. As the beam scans across a range of incident angles, the photo-sensor 506 detects incident angles that result in resonance (i.e., high-efficiency coupling) and incident angles that do not result in high-efficiency coupling. In some embodiments, there is a periodicity to incident angles resulting in resonance, such that a range of angles results in high-efficiency coupling, followed by a range of angles that results in low-efficiency coupling, followed by another range of angles that results in resonance, etc. In some embodiments, the scanning device 504 scans a beam in a stepwise fashion across a range of scan angles spanning a plurality of waveguide modes based on feedback received from the photo-sensor 506, as discussed further below.

In some embodiments, the photo-sensor 506 is included as a part of a headset assembly. In some embodiments, the photo-sensor 506 is included as part of a calibration fixture, if coupling stability is demonstrated. In some embodiments, the feedback loop operates at a lower frequency than the scanning device 504 and provides feedback from only a fraction of the scans by the scanning device 504. For example, in some embodiments, the feedback loop is utilized during factory calibration.

Figure 6:
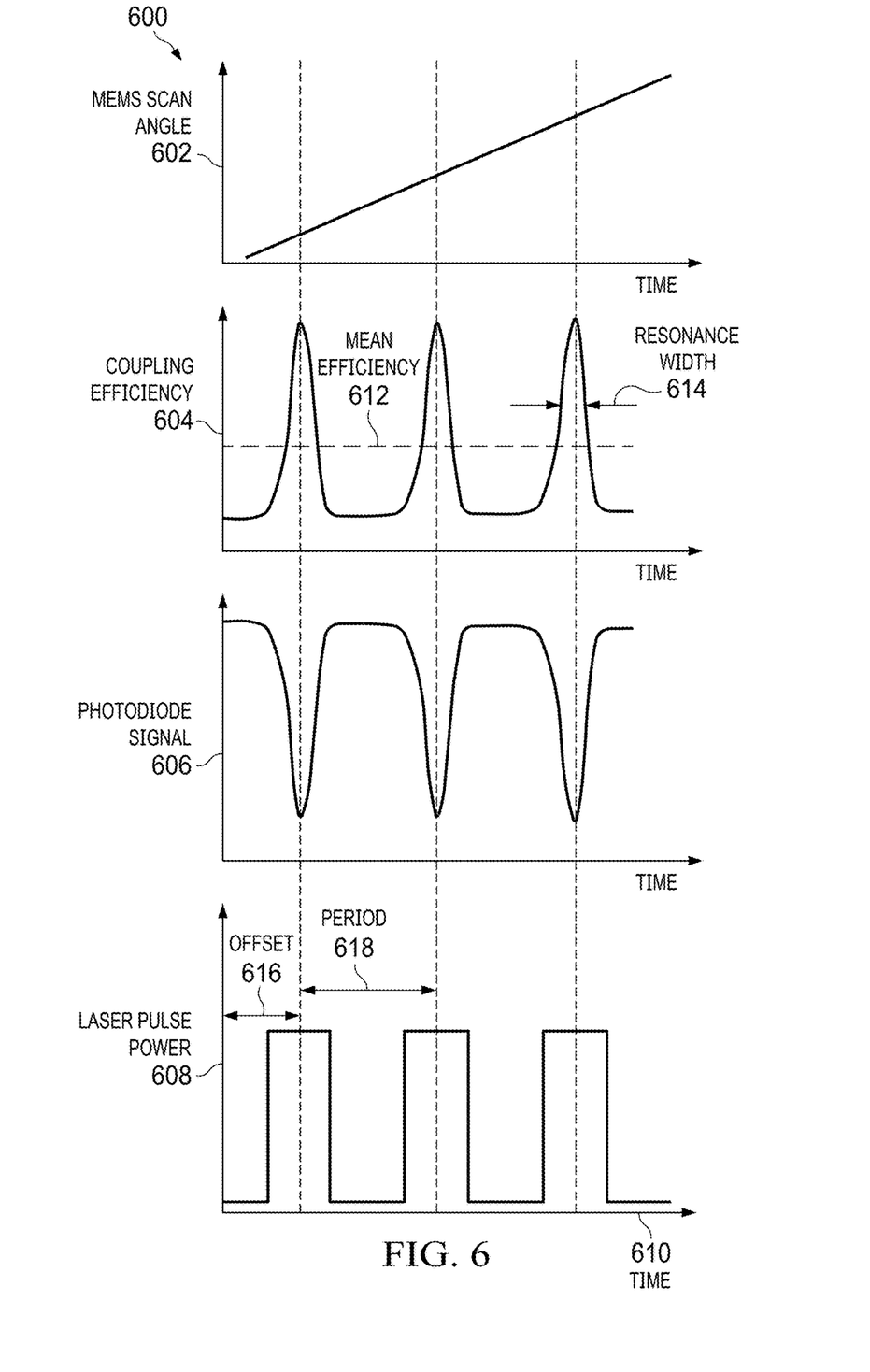
FIG. 6 is a diagram illustrating a pulse sequence optimized to couple light into a waveguide, in accordance with some embodiments.
Figure 7:
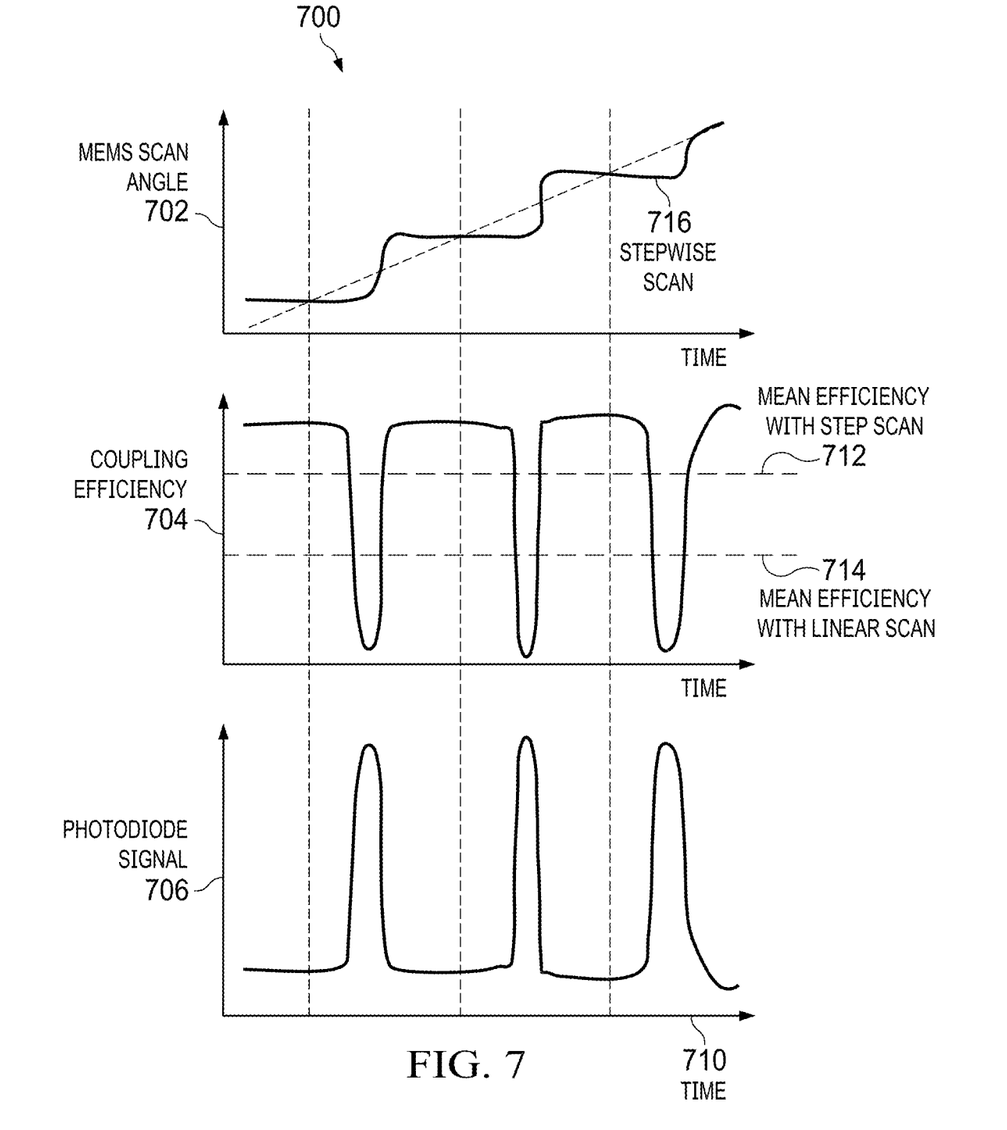
FIG. 7 is a diagram illustrating a stepwise scan sequence, in accordance with some embodiments.
Figure 8:
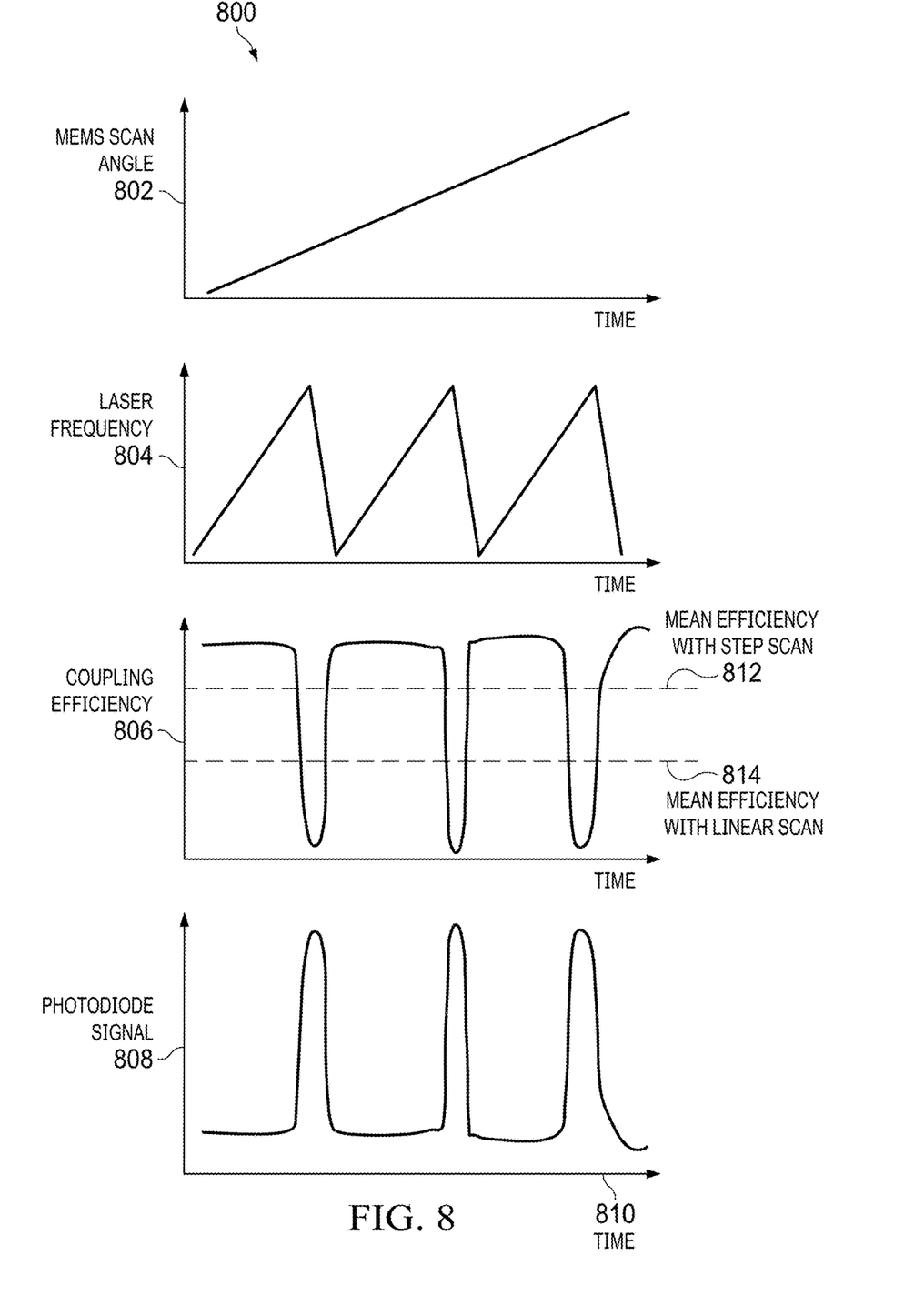
FIG. 8 is a diagram illustrating a laser frequency adjustment sequence optimized to couple light into a waveguide, in accordance with some embodiments.

FIGS. 6-8 illustrate example scan sequences for coupling light into a waveguide, in accordance with some embodiments. As discussed above with regard to the feedback circuit 500, the photo-sensor 506 measures the amount of light transmitted through the waveguide 202 and registers peaks and valleys in the efficiency of the coupling depending on whether the incident angle is within a resonance range or not. Based on feedback from the photo-sensor 506, the display device 100 determines which angles result in resonance (i.e., high-efficiency coupling) and concentrates as much of the light transmission at the high-efficiency coupling angles as possible. The controller 503 receives feedback from the photo-sensor 506 and adjusts the scan angle or amount of time spent transmitting light at each scan angle.

FIG. 6 illustrates an example pulse sequence 600 optimized to couple light into the waveguide 202. A scan angle 602, a coupling efficiency 604, a photo-sensor signal 606, and a laser pulse power 608 are each shown as a function of time 610. The coupling efficiency 604 is shown with an indication of mean efficiency 612 and resonance width 614. The laser pulse power 608 is shown with an indication of offset 616 and period 618. The scan angle 602 is swept as a function of time. The beam is swept across an angular range spanning a plurality of waveguide modes. When the beam is "on-resonance" the coupling efficiency 604 increases and the power detected in the photo-sensor 506 decreases. This signal is fed into the light engine (e.g., laser) controller 502 to time the pulses such that the laser pulse power 608 is on only when the beam is on resonance, in accordance with the resonance width 614. Thus, the beam is not turned on when it is not in resonance with the waveguide 202, advantageously saving power.

In some embodiments, the scan is swept in steps such that the beam advantageously spends as much time "on-resonance" as possible, enabling a net higher efficiency coupling into the waveguide 202, and hence, a higher display brightness. For example, the scan pauses at each resonance angle and then moves quickly through the non-resonance angles until the scan arrives at the next resonance angle. FIG. 7 illustrates an example scan sequence 700. A scan angle 702, a coupling efficiency 704, and a photo-sensor signal 706 are each shown as a function of time 710. The coupling efficiency 704 is shown with an indication of mean efficiency with step scan 712 and mean efficiency with linear scan 714. The scanning device 504 (e.g., a MEMS mirror) employs a stepwise scan 716 such that the beam angles are substantially matched to the waveguide modes (i.e., as much as possible), advantageously providing an overall higher coupling efficiency 704. In some embodiments, the stepwise scan 716 may be implemented by directly scanning the scanning device 504 (e.g., a MEMS mirror) in a stepwise manner. In some embodiments, the stepwise scan 716 may be implemented by providing at least two sets of mirrors, with one scanning linearly, and one scanning in a sinusoidal pattern such that the net effect approximates that of a step ladder.

In some embodiments, the scanning device 504 scans a laser frequency such that while the laser angle is being scanned, the laser frequency is adjusted at each angle such that the laser frequency corresponds to a laser mode. The laser scanning frequency and phase may be adjusted in a feedback loop (e.g., the feedback loop discussed above with regard to FIG. 5) to provide high efficiency coupling into the waveguide. FIG. 8 illustrates an example laser frequency adjustment sequence 800 optimized to couple light into the waveguide 202. A scan angle 802, a laser frequency 804, a coupling efficiency 806, and a photo-sensor signal 808 are each shown as a function of time 810. The coupling efficiency 806 is shown with an indication of mean efficiency with frequency scan 812 and mean efficiency with linear scan 814. The laser frequency 804 is scanned while the scan angle 802 is being swept, such that for each angle, the laser frequency 804 is tuned to a waveguide resonance mode. Thus, the laser scanning frequency and phase may be adjusted in a feedback loop (e.g., the feedback loop discussed above with regard to FIG. 5) to advantageously provide high coupling into the waveguide 202.

Figure 9:
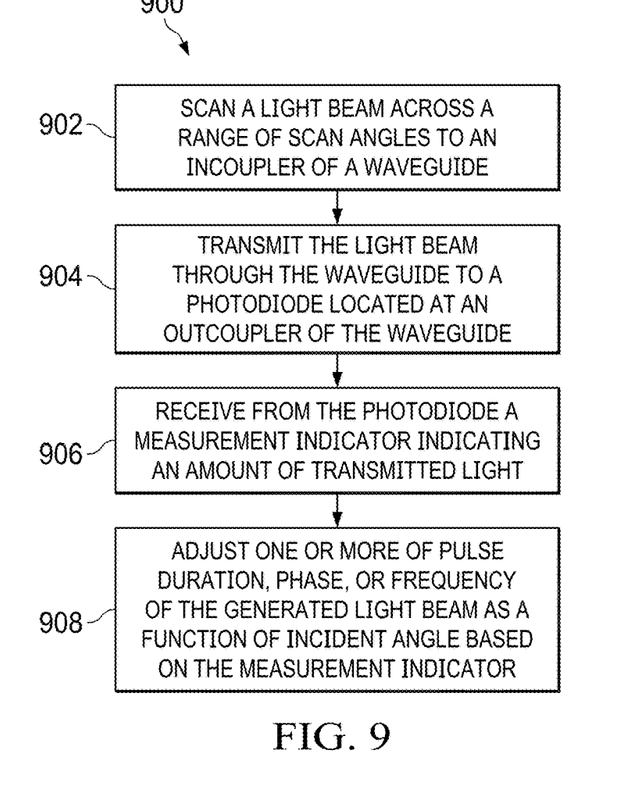
FIG. 9 is a flow chart illustrating a method for time and wavelength multiplexing, in accordance with some embodiments.

FIG. 9 is a flow chart illustrating a method for time and wavelength multiplexing, in accordance with some embodiments. At block 902, a light beam is scanned across a range of scan angles to an incoupler of a waveguide. For example, the light beam may be generated by a light engine (e.g., the light engine controller 502 of FIG. 5).

At block 904, the light beam is transmitted through the waveguide to a photo-sensor located at an outcoupler of the waveguide. For example, the light beam may be transmitted through the display waveguide to the photo-sensor 506 of FIG. 5.

At block 906, a current measurement indicator signal indicating an amount of light transmitted from the light engine through the display waveguide is received from the photo-sensor. For example, the current measurement indicator signal may be received from the photo-sensor 506 of FIG. 5. The more light the photo-sensor registers, the more light is leaking out of the waveguide (i.e., indicating poor efficiency coupling). Conversely, the less light registered by the photo-sensor, the more efficient the coupling. Additionally, the photo-sensor feedback need not be continuous. In some embodiments, the photo-sensor feedback is performed once as a calibration step to determine the high-efficiency input angles.

At block 908, one or more of pulse duration, a phase, or a pulse timing of the generated light beam are adjusted as a function of incident angle based on the measurement indicator. For example, the light engine adjustments may be determined by the light engine controller 502 of FIG. 5.

Figure 10:
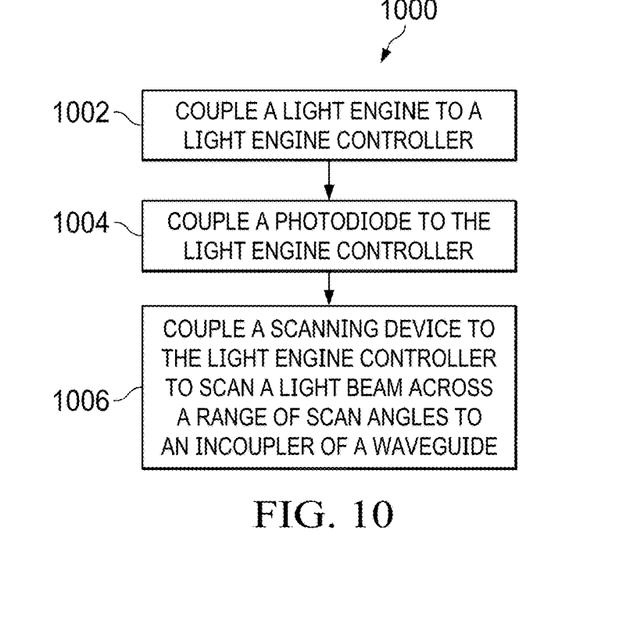
FIG. 10 is a flow chart illustrating a method of making a feedback circuit for time and wavelength multiplexing, in accordance with some embodiments.

FIG. 10 is a flow chart illustrating a method for making a feedback circuit for time and wavelength multiplexing, in accordance with some embodiments. At block 1002, a light engine is coupled to a light engine controller (e.g., the light engine controller 502 of FIG. 5). At block 1004, a photo-sensor is coupled to the light engine controller (e.g., the photo-sensor 506 of FIG. 5). At block 1006, a scanning device is coupled to the light engine controller to scan a light beam across a range of scan angles to an incoupler of a waveguide (e.g., the scanning device 504 of FIG. 5).

It should be noted that although the optical systems of the present disclosure are described and illustrated with reference to a particular example near-eye display system in the form of a wearable heads-up display (WHUD), it will be appreciated that the apparatuses and techniques of the present disclosure are not limited to this particular example, but instead may be implemented in any of a variety of display systems using the guidelines provided herein.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
   a light engine to generate light;
   a light engine controller to control operation of the light engine;
   a scanning device to scan light to an incoupler of a waveguide across a range of incident angles; and
   a photo-sensor to measure an amount of light outcoupled through the incoupler of the waveguide at the range of incident angles,
   wherein the light engine controller is to adjust one or more of a pulse duration, a phase, or a pulse timing of the scanned light, based on an incident angle of the scanned light and the measured amount of light.

2. The system of claim 1, wherein:
   the light engine controller is to identify incident angles of scanned light that result in an amount of outcoupled light that is lower than a predetermined threshold amount, and to generate light only when a scan angle is an identified incident angle.

3. The system of claim 2, wherein:
the scanning device is to scan a beam across a range of scan angles spanning a plurality of waveguide modes that indicate correlations between angles of incident light and efficiencies with which the incident light is coupled into the waveguide.

4. The system of claim 2, wherein:
the scanning device is to scan a beam stepwise across a range of scan angles spanning a plurality of waveguide modes, wherein the scanning device pauses or slows down when scanning across high-efficiency incident angles and scans relatively faster when scanning across other incident angles.

5. The system of claim 2, wherein:
the scanning device is to scan a beam stepwise across a range of scan angles spanning a plurality of waveguide modes, wherein the scanning device includes a first mirror scanning linearly and a second mirror scanning in a sinusoidal pattern.

6. The system of claim 3, wherein:
the light engine controller is to control the operation of the light engine based on determining light engine adjustments of pulse timing of generated light that correspond to a current laser mode.

7. The system of claim 1, wherein:
the light engine controller is to control the operation of the light engine based on determining one or more light engine adjustments of pulse timing, based on a current measurement indicator signal received from the photo-sensor indicating a decrease in light detected at the photo-sensor.

8. The system of claim 7, wherein:
the one or more light engine adjustments of pulse timing includes initiating deactivation of pulses based on a determination of a current mode of a beam.

9. A method comprising:
scanning light to an incoupler of a waveguide across a range of incident angles;
measuring an amount of light outcoupled through the incoupler of the waveguide at the range of incident light angles; and
adjusting one or more of a pulse duration, a phase, or a pulse frequency of the scanned light based on an incident angle of the scanned light and the measured amount of light.

10. The method of claim 9, further comprising:
identifying incident angles of scanned light that result in an amount of outcoupled light that is below a predetermined threshold amount; and
generating light only when the scan angle is an identified incident angle.

11. The method of claim 9, further comprising:
identifying incident angles of scanned light that result in an amount of outcoupled light that is above a predetermined threshold amount; and
increasing an amount of generated light scanned to the incoupler at the identified incident angles.

12. The method of claim 9, further comprising:
scanning a beam across a range of scan angles spanning a plurality of waveguide modes that indicate correlations between angles of incident light and efficiencies with which the incident light is coupled into the waveguide.

13. The method of claim 12, further comprising:
scanning a beam stepwise across a range of scan angles spanning a plurality of waveguide modes.

14. The method of claim 12, further comprising:
scanning a beam stepwise across a range of scan angles spanning a plurality of waveguide modes, using a first mirror scanning linearly and a second mirror scanning in a sinusoidal pattern.

15. The method of claim 12, further comprising:
adjusting the pulse timing to correspond to a waveguide mode.

16. The method of claim 9, further comprising:
adjusting the pulse frequency, based on a measurement indicator signal received from a photo-sensor indicating a change in light detected at the photo-sensor.

17. The method of claim 16, wherein:
adjusting the pulse frequency comprises initiating deactivation of pulses based on a decreased amount of light detected at the photo-sensor.

18. The method of claim 16, wherein:
adjusting pulse timing comprises increasing the pulse frequency in response to an increased amount of light detected at the photo-sensor.

19. A method comprising:
coupling a light engine for generating light to a light engine controller to control operation of the light engine; and
coupling a photo-sensor to the light engine controller, the photo-sensor to measure an amount of light transmitted from the light engine through a display waveguide, generate a measurement indicator signal, and send the measurement indicator signal to the light engine controller,
wherein the light engine controller is to adjust one or more of a pulse duration, a phase, or a pulse timing of the generated light, based on the measurement indicator signal received from the photo-sensor.

20. The method of claim 19, further comprising:
communicatively coupling to the light engine a scanning device to scan light transmitted from the light engine through the display waveguide to the photo-sensor.

21. The method of claim 20, wherein:
the scanning device is to scan a beam across a range of scan angles spanning a plurality of waveguide modes.

* * * * *